(12) United States Patent
Peter et al.

(10) Patent No.: US 6,359,157 B2
(45) Date of Patent: Mar. 19, 2002

(54) PROCESS FOR THE TRANSESTERIFICATION OF FAT AND/OR OIL OF BIOLOGICAL ORIGIN BY MEANS OF ALCOHOLYSIS

(76) Inventors: Siegfried Peter, Lindenweg 3, 91080 Uttenreuth (DE); Eckhard Weidner, Wasserstrasse 463a, 44795 Bochum (DE); Hans-Peter Neuner, Felseckerstrasse 33, 90489 Nürnberg (DE); Ruth Ganswindt, Bahnhofstrasse 11, 63571 Genhausen-Haller (DE)

(*) Notice: Subject to any disclaimer, the term of this patent is extended or adjusted under 35 U.S.C. 154(b) by 0 days.

(21) Appl. No.: 09/884,328

(22) Filed: Jun. 19, 2001

Related U.S. Application Data

(63) Continuation of application No. PCT/EP00/10314, filed on Oct. 19, 2000.

(30) Foreign Application Priority Data

Oct. 20, 1999 (DE) .......................................... 199 50 593

(51) Int. Cl.[7] .................................................. C11C 1/00
(52) U.S. Cl. ....................................................... 554/169
(58) Field of Search .......................................... 554/169

(56) References Cited

U.S. PATENT DOCUMENTS 6,187,939 B1 * 2/2001 Susaki et al. ............... 554/169

FOREIGN PATENT DOCUMENTS

| GB | 979523  | * | 1/1965 |
| GB | 1325924 | * | 8/1973 |
| GB | 2161809 | * | 1/1986 |

OTHER PUBLICATIONS

"Transesterification of Vegetable Oils: a Review", Schuchardt et al.; 1998; J. Braz. Chem. Soc. vol. 9, pp. 199–210.

* cited by examiner

Primary Examiner—Deborah D. Carr
(74) Attorney, Agent, or Firm—Webb Ziesenheim Lodgson Orkin & Hanson, P.C.

(57) ABSTRACT

A process for the transesterification of fat and/or oil of biological origin by means of alcoholysis comprises the following steps:

provision in a vessel of fat and/or oil of biological origin to be transesterified, and implementation of alcoholysis by addition of an alkanol, in particular of a monohydric alkanol, and of a catalyst to the fat and/or oil that has been provided.

with a view to eliminating the disadvantages of traditional transesterification processes, a metal salt of an amino acid or of an amino-acid derivative is used as catalyst, said metal salt being insoluble in alkanols.

23 Claims, No Drawings

PROCESS FOR THE TRANSESTERIFICATION OF FAT AND/OR OIL OF BIOLOGICAL ORIGIN BY MEANS OF ALCOHOLYSIS

CROSS-REFERENCE TO RELATED APPLICATIONS

This application is a continuation of International Patent Application Number PCT/EP00/10314 filed on Oct. 19, 2000, entitled "Method For the Reesterification Of Fat And/Or Oil Of Biological Origin By Means Of Alcoholysis" and designating, inter alia, the United States, which claims priority to German Patent Application Serial No. 199 50 593.4, filed Oct. 20, 1999. This application is a 371 of PCT/EP00/10314 filed Oct. 19, 2000.

BACKGROUND OF THE INVENTION

1. Field of the Invention

The invention relates to a process for obtaining fatty-acid esters from fat and/or oil of biological origin by transesterification.

Transesterification reactions as such are known; they represent a commercially important class of industrial organic reactions. In the course of a transesterification reaction an ester is converted into another ester by exchange of the acid groups or by exchange of the alcoholic groups. If the transesterification is carried out by exchange of the alcoholic groups, one speaks of so-called alcoholysis (also alkanolysis). In the case of alcoholysis the alcohol is added in excess in order to obtain a high yield of desired ester. In connection with the generation of diesel fuel from renewable raw materials the production of alkyl esters, particularly of methyl esters, by alcoholysis of vegetable oils (e.g. rapeseed oil) has recently gained considerably in topicality.

2. Description of the Related Art

Transesterification is an equilibrium reaction which, as a rule, is already triggered by mixing the reactants. However, the reaction proceeds so slowly that a catalyst is required for commercial implementation of the reaction. Conventionally use is made of strong acids or strong bases by way of catalysts.

Fats and oils of biological origin consist predominantly of glycerides (monoglycerides, diglycerides and triglycerides). In the course of the transesterification of such fats and oils the component glycerin can be substituted by low-molecular monohydric alcohols. In practice the method according to Bradshaw (described in U.S. Pat. Nos. 2,271,619 and 2,360,844) is frequently adopted for this purpose. The reaction is carried out in an open container which may consist of ordinary carbon steel. The fat or oil has to be dry (anhydrous), clean and, above all, neutral, i.e. the content of free fatty acids must be negligibly small (acid value no higher than 1.5). The initial product is heated to about 80° C., then commercial anhydrous methanol (99.7 wt. %), which contains 0.1 to 0.5 wt. % sodium hydroxide or potassium hydroxide in dissolved form, is added in excess (about 1.2 to 1.6 times the stoichiometric quantity). After addition of the alcohol the mixture is stirred for a few minutes and then allowed to stand. The glycerin begins to settle immediately. Since it is practically free from water and much heavier than the other liquids, it settles readily and forms a layer on the bottom of the container. The reaction of an oil with methanol to form methyl ester is usually 98% complete after one hour. The bottom layer (lower layer) contains not less than 90% of the glycerin originally present in the fat. The upper layer is composed of methyl esters, unconverted alcohol and alkali, the remaining glycerin, and a very small amount of soap. These various contaminants are washed out of the esters by repeated washing with small quantities of warm water. The method is advantageous, because methyl esters or ethyl esters can be obtained from the fat directly without any intermediate step, the reaction temperature is low and no items of apparatus made of special corrosion-resistant material are required.

With the method according to Bradshaw the methyl esters that are obtained are subsequently used in a continuous process for the production of anhydrous soap. For this purpose the esters are saponified at low temperature by means of sodium hydroxide and potassium hydroxide and the readily volatile methanol that is released in the process is recovered.

Feuge and Gros studied the transesterification of peanut oil with ethanol (J. Am. Chem. Soc. 26 [1949] 97–102). They found that the optimal temperature for the reaction lies in the vicinity of 50° C. A higher yield of glycerin was obtained at this temperature than at 30° C. or 70° C.

Toyama et. al. (Y. Toyama, T. Tsuchiya and T. Ishikava, J. Soc. Chem. Ind. Japan, 36 [1933] 230–232B) showed that the equilibrium between methanol or ethanol and fats in the presence of sodium hydroxide is attained at room temperature within two hours. In order to take the reaction as far as complete conversion of the fat into monoester, the glycerin that is released has to be removed.

In a paper by Wright et. al. (H. J. Wright, J. B. Segur, H. V. Clark, S. K. Coburn, E. E. Langdon and R. N. DuPuis, Oil & Soap, 21 [1944] 145–148) the exact conditions for the alcoholysis of fats with methanol and ethanol were investigated in detail. Moreover, a report is given by the authors about experiments on alcoholysis with other monohydric alcohols. It is stated that the alcoholysis as described above, which is catalysed with alkali, is only completely successful when the fat is virtually free from free fatty acids and the reaction mixture is free from water. If one of these conditions is not satisfied, saponification occurs, which results in a loss of alkalinity and the formation of a gel structure which prevents or slows down the separation and settling of the glycerin.

Difficulties arise in the course of ethanolysis if the content of free fatty acids in the fat amounts to more than about 0.5 wt. %. If 30 parts of ethanol, 100 parts of cottonseed oil and 0.5 wt. % sodium hydroxide are caused to react, the yield of glycerin is diminished considerably by virtue of 0.3 wt. % water in the reaction mixture. However, the effect of the moisture can be partly compensated by adding further alkali and/or alcohol. If the catalyst content is doubled or the quantity of alcohol is increased to 40 parts, the water content in the reaction mixture may amount to up to 0.6 wt. %.

Similarly, it is shown by Wright et. al. that the rate of the overall reaction is fundamentally limited by the time that the glycerin requires for separation by gravity. A continuous separation by centrifuging at 65° C. with a dwell-time of about 5 minutes yielded a rather good result of approximately 85% of the theoretical value. The statement by Bradshaw and Meuly that less alcohol is needed in the case of stepwise addition of the alcohol and removal of the glycerin arising was confirmed for methanolysis but not for ethanolysis, in the case of which this procedure leads to gelling.

Various problems arise in particular when use is made of sodium compounds and potassium compounds by way of catalysts in the course of the transesterification of triglycerides with methanol and ethanol. For instance, by reason of the emulsion that has formed in the reaction, after the transesterification reaction has taken place the two phases separate at such a slow rate that the separation is very prolonged and large reaction volumes are necessary. In addition, even after the phase separation very fine droplets of glycerin still remain suspended in the monoester phase, which have to be washed out with water. Furthermore, the catalyst, which is distributed in both phases, has to be removed at least from the monoester phase after the reaction has been concluded. Depending on the further use of the glycerin, it is furthermore necessary to remove the dissolved catalyst also from the glycerin phase. It is regarded as an additional problem that the reaction sometimes does not set in immediately after the mixture has been produced.

A number of processes have been proposed with a view to solving the stated problems. For instance, in U.S. Pat. No. 2,383,614 a process for the continuous alcoholysis of fat is described in which a partial esterification of the fat or oil is carried out, optionally in several steps, and deposition of the glycerin is also undertaken in several stages. According to U.S. Pat. No. 2,383,580, after completion of the reaction firstly the catalyst that is used is inhibited by neutralisation of the reaction mixture and then the excess alcohol is removed by distillation. The remaining reaction mixture is distilled in a vacuum. In the process the condensate separates into a layer of glycerin and a layer of fatty-acid alkyl ester.

According to the method proposed in U.S. Pat. No. 4,164,506, in a two-stage process firstly the free fatty acids are converted into the corresponding esters with short-chain alcohols in the presence of acidic catalysts. After this, transesterification of the glycerides is undertaken in the presence of alkali, accompanied by deposition of glycerin.

In German published application DE 34 21 217 A1 a process is described for producing fatty-acid esters of short-chain primary and secondary alcohols with 1 to 5 carbon atoms by transesterification of glycerides. In this process a stream of the gaseous alcohol is passed through the liquid glycerides at temperatures between 230 and 270° C. With this stream the product mixture consisting of glycerin and fatty-acid alkyl ester is discharged from the reaction zone and subsequently separated. By the action of a catalyst, alkali is dissolved in the liquid glycerides of the reaction vessel.

According to the process described in German patent specification DE 198 03 053 C1, triglycerides are converted with alcohol in multiple molar excess in the presence of suitable catalysts, such as zinc soaps for example, preferably in parallel-flow columns at temperatures from 200 to 240° C. and at pressures up to 90 bar. After separation of the excess alcohol, mixtures of alkyl ester and glycerin are obtained which are separated in a separator into the lighter organic phase and into the glycerin phase. This phase separation is directly followed by further processing and cleaning of the products. The ester phase is washed with water in order to remove the glycerin residues dissolved in the product. In this process about 40% of the zinc soaps dissolved in the ester by way of catalyst are also washed out in the form of zinc hydroxide.

Furthermore, investigations have been carried out with the aim of replacing the sodium compounds and potassium compounds with basic ammonium compounds by way of catalyst or reactant. Schuchardt et. al (J. Braz. Chem. Soc. 9 [1998] 199–210) investigated the activity of numerous non-ionic bases with regard to their suitability as catalyst for the alcoholysis of fats and oils, e.g. amines such as triethylamine, piperidine, 1,2,2,6,6,-pentamethylpyridine, pyridine, 2,6-di-tert.-butylpyridine, 4-dimethylaminopyridine (DAMP), guanidines such as 1,5,7-triazabicyclo[4.4.0]dec-5-ene (TBD), 1,1,3,3-tetramethylguanidine (TMG), 1,1,2,3,3,-pentabutylguanidine (PBG), 1,3-diphenylguanidine, 1,2,3-triphenylguanidine and other aminoguanidines and nitroguanidines, triamino(imino)phosphoranes such as tert.-butylimino-2-diethylamino-1,3-perhydro-1,2,3-diazaphosphorane (BEMP), tris(dimethylamino)methylimino-phosphorane ($Me_7P$). The latter are frequently used in organic synthesis. In one series the catalytic activity of a number of guanidines, e.g. the amidines DBU and DBN, and of the phosphoranes BEMP and $Me_7P$ was compared with other bases. The guanidines are the more active catalysts. Their activity conforms to their relative basicity. The activity of TBD at a concentration of 3 mol % was similar to that of 3-mol % potassium carbonate.

The advantage that guanidines offer in the transesterification of fats and oils of biological origin consists in the possibility of heterogenising them on organic polymers and therefore of attaining heterogeneous catalysis. Schuchardt et. al. investigated cellulose, polystyrene/divinylbenzene, and polyurethanes with respect to their suitability as carrier material for guanidines. The heterogenisation of guanidines on organic polymers and their use in the transesterification of vegetable oils are described in Brazilian Patent 8202429 (1984, inventors U. Schuchardt and O. C. Lopes). The guanidines, which were bound to gel-like poly(styrene/divinylbenzene) or cellulose, showed a slightly reduced activity in comparison with the catalytic reaction in homogeneous phase. But they allow the same high conversions after extended reaction-times. Although less active than their homogeneous analogues, all the guanidines containing polymer were able to be re-used in a number of consecutive reaction cycles. However, a loss of activity was observed;, already after about 9 reaction cycles an abatement of the activity could be detected. This decline in activity upon repeated use was mainly caused by the slow lixiviation of the anchored base out of the polymers.

State of the art is, moreover, the catalytic acceleration of the transesterification of methyl phthalates with glycols by zinc acetate and other acidic catalysts. The alcoholysis of fats and oils with the aid of zinc soaps as catalysts at high temperatures (above 210° C.) is described in the aforementioned DE 198 03 053 C1. Since heavy-metal soaps, such as zinc acetate for example, are soluble in the reaction mixture consisting of alkanol, oil, fatty acid, alkanol ester and glycerin, heterogeneous catalysis is not possible. In addition to this, at lower temperatures, e.g. at 850° C., no noticeable conversions with zinc soaps as catalyst were found.

From the foregoing it follows that the production of simple fatty-acid esters from fat and/or oil of biological origin has not been solved satisfactorily heretofore. Fats and oils of biological origin also always contain, in addition to glycerides, free fatty acids, with which the catalysts that are traditionally used (in particular, alkali oxides or alkali alcoholates) are not compatible or are only poorly compatible. Free fatty acids that are present in the initial product therefore have to be removed, with the exception of residual concentrations of 0.1 wt. % and less, prior to the transesterification, particularly if use is to be made of alkaline catalysts. If the initial product contains a large quantity of free fatty acids, chemical deacidification is too elaborate, and deacidification is then conventionally effected by means of so-called steam stripping at 240 ° C. to 260° C. The high temperature requires a corresponding expenditure of energy.

BRIEF SUMMARY OF THE INVENTION

The object underlying the invention is therefore to provide a heterogeneously catalysed process for the transesterification of fat and/or oil of biological origin, wherein the catalyst that is used is stable and the products arising are not contaminated by catalyst material. In particular, with the new process the free fatty acids that are present in the initial material are also to be converted into esters, in order in this way to eliminate the deacidification that has been necessary hitherto. The new process is simple to carry out and results in good yields.

The present invention involves placing the fat and/or oil of biological origin in a vessel. Alcoholysis is induced by the addition of an alcohol, preferably a monohydric alcohol, and a catalyst to the fat and/or oil that has been provided. The catalyst is a metal salt of an amino acid or of an amino acid derivative. The metal salt is insoluble in alkanols.

Surprisingly, it was accordingly found that the zinc salt of arginine, for example, is insoluble in methanol and, furthermore, in mixtures of glycerides, glycerin, methyl esters and methanol such as are found in the course of methanolysis. After extraction for 4 hours with methanol in a Soxhlet apparatus, no weight loss could be detected. Consequently this compound is well suited as a catalyst for heterogeneously catalysed transesterification. In the course of methanolysis with zinc arginate as catalyst at 85° C. and with an addition of 6 mole equivalents of methanol to deacidified palm oil during the course of 180 minutes a yield of 45% methyl esters was obtained. Under the same conditions with zinc glycinate as catalyst a yield of only 0.5% methyl esters was obtained with a contact-time of 180 minutes. The higher activity of zinc arginate at low temperatures might be attributable to the higher basicity of arginine in comparison with glycine. At 135° C. the difference in the catalytic activity between zinc arginate and zinc glycinate is less than at 70° C. Zinc arginate is distinguished in that it is soluble neither in the methanol nor in the fats and oils; it can consequently serve as a basis for heterogeneously catalysed alcoholysis. Analogous behaviour is shown by the arginate of cadmium.

Zinc arginate can be compressed into relatively stable pellets and installed into a tubular reactor in this form as packing. Another processing mode consists in the pulverulent, finely crystalline metal arginate being suspended in the mixture of oil and alkanol. After passing through a cascade of stirred-tank reactors, the catalyst is filtered off or separated with a centrifuge and recirculated. Subsequently the mixture that has been formed in the course of the reaction, consisting of excess methanol, glycerin and, optionally, water (in the case of an higher concentrations of free fatty acids in the feed), is lava decanted from the methyl-ester phase. The esters that have been formed are freed from unsaponifiable and unconverted residues and purified by distillation.

Moreover, it turned out that heavy-metal salts of amino acids, which are insoluble in the reaction mixtures consisting of glycerides, alcohols, fatty-acid alkyl esters and glycerin, catalyse the alcoholysis of glycerides also in the presence of free fatty acids. Preferred metals are: zinc, lanthanum, cadmium, iron, etc. In this connection the fats and oils arising for the purpose of transesterification may contain larger quantities of free fatty acids. Even at concentrations of free fatty acids amounting to around 10 wt. %, the rate of the transesterification reaction with the catalysts according to this invention at temperatures above 100° C. is sufficient for commercial application. Preferred alkanols for the process according to this invention are primary and secondary alkanols with 1 to 6 C atoms.

In the presence of higher concentrations of free fatty acids the rate of reaction is somewhat diminished in comparison with the reaction with fat-free neutral oils. By increasing the alkanol concentration and/or the temperature and/or the catalyst concentration, the decline in the activity of the catalyst can be compensated and a rate of reaction that is sufficient for practical purposes can be obtained.

Further investigations showed that the heavy-metal salts of betaine, carnitine, and taurine, which contain quaternary nitrogen, are also suitable as catalysts for the transesterification of glycerides with alkanols. At temperatures above 100° C. they show good catalytic activity. The lanthanum salt of taurine is attractive on account of its stability when subjected to temperature loading and its insolubility in the reaction media entering into consideration.

The catalysts according to this invention do not form with the free fatty acids any soaps that render the separation of the glycerin difficult by virtue of emulsifier action. After a contact-time of 93 hours no abatement of the catalytic activity of zinc arginate could be observed at 135° C. No diminution of the concentration of by-products, such as tocopherols, tocotrienols and carotenes, was observed at the relatively high temperature of 135° C., even with reaction-times of more than 4 hours.

In the course of the esterification of triglycerides in the batch process in the case of a higher content of free fatty acids it is occasionally advantageous to add the alkanol in stepwise manner. In the first step about ⅓ of the overall quantity of alkanol provided is added and a period of waiting is observed until the alkanol has been converted. After this, the next portion is added and again a short waiting-period is observed. This procedure is continued until the entire amount of alkanol has been caused to react.

In the course of the transesterification according to the invention of triglycerides that contain relatively large quantities of free fatty acids, the water that is formed together with glycerin in the mixture is precipitated out with glycerin as a separate, heavy phase. The mixture of glycerin and water is decanted. Since the formation of soaps is ruled out in the case where use is made of a solid catalyst, the joint formation of glycerin and water does not give rise to any increase in the tendency towards emulsification. The separation of the reaction mixture into two liquid phases takes place quickly and completely at temperatures above 100° C. Two co-existing clear liquid phases arise. At lower temperatures the use of a centrifuge is advisable.

Conventional alkanolysis, which is accelerated with basic catalysts such as sodium methylate, sodium hydroxide, potassium methylate, potassium hydroxide etc, requires the free fatty acids to be removed from the initial material as extensively as possible. Since the fats and oils that are derived from oil-bearing seeds only in rare cases contain free fatty acids in a concentration of more than 20 wt. %, in the course of the alkanolysis according to the process of this invention a deacidification of the initial product is generally superfluous. The omission of this intermediate step represents a significant cost-saving in respect of operating resources, investments and effort.

If—as proposed in accordance with the invention—use is made of salts that are insoluble in the reaction mixture, the advantages of a heterogeneous mode of processing can be utilised. In this case the two liquid phases arising in the course of the alcoholysis contain no catalyst, markedly simplifying their processing. Since the catalysts according to this invention are temperature-resistant up to about 200° C., it is possible to carry out the alcoholysis in the temperature range up to 180° C. without any side-reaction occurring. Finally, the rate of reaction at temperatures above 120° C. is so high that continuous process control is possible.

A number of amino acids that are suitable for the process according to this invention are listed below: arginine, asparagine, carnitine, creatine, betaine, dimethylglycine, glycine, lysine, ornithine, taurine etc. The heavy-metal salts of these amino acids that are insoluble in the alkanols are suitable as catalysts for the heterogeneous transesterification of fats and oils with alkanols.

The process will be elucidated in more detail below on the basis of various examples, without thereby restricting the claimed protection.

EXAMPLE 1

100 g of palm oil that contained 2.0 wt. % free palmitic acid, 0.7 wt. % free oleic acid, 1.5 wt. % free linoleic acid and linolenic acid and 0.2 wt. % stearic acid were mixed with 30 ml methanol in which 0.8 g of a fine powder of zinc arginate was suspended. The mixture was passed into a closed metal vessel and was heated to 135° C. In the process a pressure of about 5 bar arose, which was caused by the existing methanol. After 70 minutes the mixture was cooled and the oil phase was analysed with respect to its content of methyl esters. 70 wt. % of the triglycerides of the palm oil had been converted into methyl esters. The zinc arginate was left unchanged. Heterogeneous catalysis was consequently present.

EXAMPLE 2

100 g of palm oil with a content of free fatty acids corresponding to Example 1 were mixed with 35 ml methanol, and 6 g of the pulverulent calcium salt of 2-amino-5-guanidino-valeric acid were subsequently suspended in the mixture. The mixture was heated in an autoclave to 80° C. at ambient pressure. After 250 minutes a sample was withdrawn from the oil phase and analysed. 57 wt. % of the triglycerides employed had been converted into methyl esters. The yield of glycerin amounted to 90 wt. %. The calcium arginate was preserved substantially unchanged as solid substance in the course of the reaction; only an insignificant proportion went into solution.

EXAMPLE 3

100 g of deacidified sunflower oil were mixed with 30 ml methanol, whereupon 8 g of pulverulent zinc salt of 2-amino-5-guanidinovaleric acid (zinc arginate) were suspended in the mixture. The mixture was caused to react at 80° C. and at ambient pressure. After 200 minutes 30 wt. % of the oil had been converted into methyl esters. The zinc arginate was preserved unchanged in the solid state.

EXAMPLE 4

100 g of palm oil with a content of free fatty acids amounting to 4.4 wt. % were mixed with 30 ml methanol and 6 g of a pulverulent zinc salt of aminoacetic acid (glycine). The mixture was heated to 85° C. After 120 minutes 0.1 wt. % methyl esters had been formed. After this, the reaction mixture was passed into a closed vessel and heated to 135° C. A pressure of 6 bar arose above the reaction mixture, corresponding to the vapour pressure of the methanol. After a period of 70 minutes 65 wt. % of the palm oil that was employed had already been converted into methyl esters. Under reaction conditions about 50% of the zinc glycinate had gone into solution, which, for the most part, were precipitated out again after the reaction mixture had cooled. Consequently, in view of the stated reaction conditions it is to be assumed that homogeneous catalysis and heterogeneous catalysis proceeded side by side in parallel. The glycerin that had been formed was precipitated out with the dissolved reaction water as a heavy phase.

EXAMPLE 5

60 g of deacidified sunflower oil were mixed with 20 ml methanol and 3 g of pulverulent zinc arginate and caused to react in an autoclave at 135° C. A pressure of 6 bar arose. After 180 minutes 73 wt. % of the sunflower oil had been converted into methyl esters. The zinc arginate was present unchanged in the solid state during and after the reaction.

EXAMPLE 6

100 g of palm oil with a content of 4.4 wt. % free fatty acids were mixed with 30 ml methanol and 4 g of pulverulent lanthanum arginate and subsequently heated to 135° C. After 120 minutes 73 wt. % of the palm oil had been converted into methyl esters. During the course of the reaction a small quantity of lanthanum arginate went into solution.

EXAMPLE 7

100 g of steamer condensate with a content of free fatty acids amounting to 90 wt. % were mixed with 30 ml methanol and 6 g of pulverulent zinc arginate and were heated to 80° C. After 120 minutes 4 wt. % of the steamer condensate had been converted into methyl esters. The zinc arginate was left unchanged.

EXAMPLE 8

60 g of palm oil with 4.4 wt. % free fatty acids were mixed with 30 ml methanol and 0.8 g of pulverulent zinc arginate and were heated to 135° C. The zinc arginate had previously been in use for 18 hours. After a reaction-time of 120 minutes 67 wt. % of the oil had reacted to form methyl esters. Upon addition of fresh zinc arginate, after 120 minutes 64 wt. % of palm oil had been converted into methyl esters under the same conditions.

EXAMPLE 9

60 g of palm oil with a content of free fatty acids amounting to 4.4 wt. % were mixed with 20 g methanol and 4 g zinc glycine and were heated to 80° C. After 120 minutes 0.1 wt. % methyl esters had been formed.

EXAMPLE 10

100 g of a steamer condensate consisting of 81.5 wt. % free fatty acids and 18.5 wt. % triglycerides were mixed with 25 g zinc arginate and 17 ml methanol. The suspension was heated to 135° C.; in the process a pressure of 5 bar arose in the reaction vessel. After 120 minutes the oil phase contained 55 wt. % methyl esters. The zinc arginate remained unchanged during the reaction.

EXAMPLE 11

100 g of a palm oil that contained 4.4 wt. % free fatty acids were mixed with 25 g of zinc-arginate powder and 20 ml ethanol, and the suspension that was formed was heated to 135° C. A pressure of about 5 bar arose in the reaction vessel. After 120 minutes 36 wt. % ethyl esters were present in the oil phase. The zinc arginate was left unchanged.

EXAMPLE 12

100 g of palm oil with a content of 4.4 wt. % free fatty acids were mixed with 97 g of pulverulent zinc arginate and 32 ml methanol. The suspension was heated to 80° C. After 120 minutes the oil phase contained 20 wt. % methyl esters.

EXAMPLE 13

100 g of palm oil with 4.4 wt. % free fatty acids were mixed with 12 g of pulverulent zinc creatinate and 18 ml methanol. The suspension was heated to 80° C. After 120 minutes 13 wt. % of the oil had been converted into methyl esters. Although the solubility of zinc creatinate in methanol is less than 0.1%, for a continuous heterogeneous process it might still be too high.

EXAMPLE 14

100 g of a product that had been obtained in the course of the chemical deacidification of sunflower oil and that consisted of free fatty acids in a proportion amounting to 80.5 wt. % were added to 25 ml methanol and 17 g of pulverulent zinc arginate The suspension was heated in an autoclave to 145° C., whereby a pressure of 8.5 bar arose. After a reaction-time of 30 minutes the reaction mixture contained 43 wt. % methyl esters.

EXAMPLE 15

100 g of palm oil with a content of free fatty acids amounting to 4.4 wt. % were mixed with 14 g of pulverulent zinc asparagate and 20 ml methanol. The suspension was heated in an autoclave to 135° C. After 90 minutes the reaction mixture contained 13 wt. % methyl esters.

EXAMPLE 16

150 g of deacidified palm oil were mixed with 20 g of to pulverulent nickel arginate and 100 ml methanol. The suspension was heated at ambient pressure to 80° C. After a reaction-time of 30 minutes the oil had been completely (99.8 wt. %) converted into methyl esters. A large part of the nickel arginate was lost as a result of reaction with the glycerin that was formed.

EXAMPLE 17

100 g of sunflower oil with a content of 0.8 wt. % of free fatty acids were mixed with 6 equivalents of methanol, and the mixture was pumped at 125° C. over a packing of fine-grained zinc arginate. A pressure of about 5 bar prevailed in the autoclave. After a contact-time of 21 minutes the reaction mixture contained 80% methyl esters. The content of free fatty acids had diminished slightly in the process to 0.7%.

EXAMPLE 18

100 g of deacidified sunflower oil were mixed with 6 equivalents of methanol, and the mixture was pumped at 125° C. over a packing of fine-grained zinc arginate. In the autoclave a pressure of about 5 bar was measured. After a contact-time of 20 minutes the reaction mixture contained 86% methyl esters.

EXAMPLE 19

100 g of deacidified rapeseed oil were mixed with 6 equivalents of methanol, and the mixture was pumped at 125° C. through a packing of fine-grained zinc arginate. In the autoclave a pressure of about 5 bar arose. After a contact-time of 20 minutes the reaction mixture contained 58% methyl esters.

EXAMPLE 20

100 g of sunflower oil were mixed with 6 equivalents of methanol (83 ml), and the mixture was pumped through a packing of coarse-grained catalyst at 125° C. The catalyst had been produced by precipitation of a zinc salt with carnitine (3-hydroxy-4-trimethylammoniobutyrate). A pressure of about 4 bar arose in the autoclave. After a contact-time of 17 minutes the oil phase contained, deducting methanol, 55% methyl esters. The zinc carnitinate was left unchanged.

EXAMPLE 21

50 g of deacidified palm oil were mixed with 40 ml methanol. 3 g of pulverulent cadmium arginate were suspended in the mixture. The suspension was heated at the reflux condenser to 85° C. with mild boiling. After 120 minutes 19% of the palm oil had been converted into methyl esters. The cadmium salt of arginine is stable and remains unchanged during the course of the reaction.

EXAMPLE 22

100 g of deacidified palm oil were mixed with 80 ml methanol, and the mixture was pumped at 125° C. through a fixed bed of granular zinc salt of carnitine. After a contact-time of 30 minutes the reaction mixture contained 40% methyl esters. The zinc salt of carnitine did not exhibit any change.

EXAMPLE 23

100 g of a mixture of 85% methyl esters and 15% glycerides were mixed with 46 ml 2-propanol, and the mixture was pumped at 150° C. through a packing of fine-grained zinc arginate. After a contact-time of 15 minutes the reaction mixture contained, deducting alkanols, 5% isopropyl ester.

EXAMPLE 24

76 g of deacidified palm oil were mixed with 62 ml 2-propanol. The mixture was pumped at 150° C. through a packing of fine-grained zinc arginate. After a contact-time of 20 minutes the reaction mixture contained, deducting alkanol, 15% isopropyl ester.

EXAMPLE 25

100 g of deacidified palm oil were mixed with 81 ml methanol. The mixture was pumped at 125° C. through a packing of the fine-grained zinc salt of taurine (2-aminoethanesulfonic acid). After a dwell-time of 20 minutes the reaction mixture contained, deducting methanol, 25% methyl ester.

EXAMPLE 26

74.5 g of deacidified palm oil were mixed with 64 ml methanol (molar relationship 1:6). The mixture was pumped at 125° C. through a packing of the fine-grained precipitation of zinc through betaine (trimethylammonioacetate). After a dwell-time of 18 minutes 56% of the palm oil had been converted into methyl esters.

EXAMPLE 27

97 g of deacidified palm oil were mixed with 20 ml methanol (molar relationship 1:1.5). The mixture was caused to react with 4 g fine-grained iron arginate at 85° C. and constantly stirred. After 120 minutes 17% of the palm oil had been converted into methyl esters. No change was observed at the catalyst.

EXAMPLE 28

98 g of deacidified palm oil were mixed with 75 ml methanol (molar relationship 1:5.6). The mixture was pumped at 125° C. through a packing of fine-grained lanthanum tauride. After a contact-time of 120 minutes 10% of the palm oil had been converted into methyl esters. The lanthanum tauride remained unchanged.

What is claimed is:

1. A process for the transesterification of fat and/or oil of biological origin by means of alcoholysis, comprising the steps of:
provision in a vessel of fat and/or oil of biological origin to be transesterified, and
implementation of alcoholysis by addition of an alkanol, in particular of a monohydric alkanol, and of a catalyst to the fat and/or oil that has been provided, the catalyst being a metal salt of an amino acid or of an amino acid derivative, said metal salt being insoluble in alkanols.

2. The process of claim 1, wherein the metal component of the catalyst is selected from the group consisting of alkaline-earth metals, heavy metals, and rare-earth metals.

3. The process of claim 1, wherein the amino acid component of the catalyst contains a molecular structure selected from the group consisting of quaternary nitrogen and a guanidine group.

4. The process of claim 1, wherein the catalyst is insoluble in the reaction mixture consisting of glycerides, alcohols, fatty-acid esters and glycerin.

5. The process of claim 1, wherein the catalyst is a heavy-metal salt of arginine.

6. The process of claim 1, wherein the catalyst is a salt of lanthanum with an amino acid.

7. The process of claim 1, wherein the catalyst is the zinc salt of carnitine.

8. The process of claim 1, wherein the catalyst is the calcium salt of 2-amino-5-guanidinovaleric acid.

9. The process of claim 1, wherein the catalyst is a salt of glycine.

10. The process of claim 1, wherein the catalyst is the zinc salt of creatine (N-guanil-N-methylglycine).

11. The process of claim 1, wherein the alcoholysis is carried out at temperatures in the range from 60° C. to 200° C.

12. The process of claim 1, wherein the proportion of free fatty acids in the fat and/or oil that has been provided amounts to more than 0.2 wt. %.

13. The process of claim 1, wherein the proportion of free fatty acids in the fat and/or oil that has been provided amounts to more than 4 wt. %.

14. The process of claim 1, wherein the proportion of free fatty acids in the fat and/or oil that has been provided amounts to more than 10 wt. %.

15. The process of claim 1, wherein the proportion of free fatty acids in the fat and/or oil that has been provided amounts to more than 20 wt. %.

16. The process of claim 1, wherein the proportion of free fatty acids in the fat and/or oil that has been provided amounts to more than 50 wt. %.

17. The process of claim 1, wherein the proportion of free fatty acids in the fat and/or oil that has been provided amounts to more than 80 wt. %.

18. The process of claim 1, wherein the proportion of free fatty acids in the fat and/or oil that has been provided amounts to 90 wt. %.

19. The process of claim 1, wherein the metal component of the catalyst is selected from the group consisting of calcium, strontium, barium, silver, copper, zinc, manganese, iron, nickel, cobalt and lanthanum.

20. The process of claim 1, wherein the catalyst is selected from the group consisting of the zinc salt of arginine, the cadmium salt of arginine, the lanthanum salt of taurine, the lanthanum salt of dimethylaminoacetic acid, the lanthanum salt of 2-amino-5-guanidinovaleric acid, and the zinc salt of N,N-dimethylglycine.

21. The process of claim 1, wherein the alcoholysis is carried out at temperatures in the range from 80° C. to 180° C.

22. The process of claim 1, wherein the alcoholysis is carried out at temperatures in the range from 120° C. to 150° C.

23. The process of claim 1, wherein the proportion of free fatty acids in the fat and/or oil that has been provided amounts to more than 1 wt. %.

* * * * *

UNITED STATES PATENT AND TRADEMARK OFFICE
CERTIFICATE OF CORRECTION

PATENT NO. : 6,359,157 B2  
DATED : March 19, 2002  
INVENTOR(S) : Peter et al.

It is certified that error appears in the above-identified patent and that said Letters Patent is hereby corrected as shown below:

<u>Title page,</u>  
Item [74], *Attorney, Agent or Firm,* "Lodgson" should read -- Logsdon --.  
Item [57], ABSTRACT,  
Line 9, "with" should read -- With --.

<u>Column 1,</u>  
Lines 15-16, after "1999." delete -- This application is a 371 of PCT/EP00/10314 filed Oct. 19, 2000 --.  
After line 22, insert -- 2. Description of the Related Art --.  
Line 37, delete -- 2. Description of the Related Art --.

<u>Column 4,</u>  
Line 35, "observed;," should read -- observed; --.  
Line 49, "850º C." should read -- 85º C.--.

<u>Column 5,</u>  
Before line 18, insert -- DETAILED DESCRIPTION OF THE INVENTION --.  
Line 51, before "higher" delete -- an --.  
Line 52, before "decanted" delete -- lava --.

Signed and Sealed this

Twenty-third Day of July, 2002

*Attest:*

*Attesting Officer*

JAMES E. ROGAN  
*Director of the United States Patent and Trademark Office*